United States Patent [19]
Bando

[11] Patent Number: 5,889,741
[45] Date of Patent: Mar. 30, 1999

[54] AUTOMATIC DISK CHANGER

[75] Inventor: Takayoshi Bando, Daito, Japan

[73] Assignee: Funai Electric Co., Ltd., Osaka, Japan

[21] Appl. No.: 843,994

[22] Filed: Apr. 17, 1997

[30] Foreign Application Priority Data

Apr. 17, 1996 [JP] Japan ................................. 8-094936

[51] Int. Cl.⁶ .............................................. G11B 17/04
[52] U.S. Cl. ........................................................ 369/36
[58] Field of Search ............................. 369/36, 34, 194, 369/191, 178; 360/99.02, 99.06, 98.01, 98.04

[56] References Cited

U.S. PATENT DOCUMENTS

| | | | |
|---|---|---|---|
| 4,996,680 | 2/1991 | Staar | 369/36 |
| 5,136,562 | 8/1992 | Staar | 369/36 |
| 5,282,183 | 1/1994 | Arifuku et al. | 369/36 |
| 5,550,801 | 8/1996 | Enomoto et al. | 369/36 |
| 5,754,519 | 5/1998 | Bando | 369/36 |

FOREIGN PATENT DOCUMENTS 61-156563   7/1986   Japan .

*Primary Examiner*—Allen T. Cao
*Attorney, Agent, or Firm*—Bacon & Thomas, PLLC

[57] ABSTRACT

An automatic disk changer including: a pair of arms adapted to clamp a disk; a pair of coupling bars which are coupled through gear mechanisms to the base end portions of the arms, respectively; a cam adapted to swing the arms with the aid of the coupling bars; and a disk presence/absence detector which is provided confronted with one of the coupling bars. In the disk changer, the two arms are swung by the cam with the aid of the coupling bars, and when the angle formed by the two arms becomes smaller than the angle formed when the disk is actually clamped between them, the disk presence/absence detector is operated by the one of the coupling bar.

8 Claims, 16 Drawing Sheets

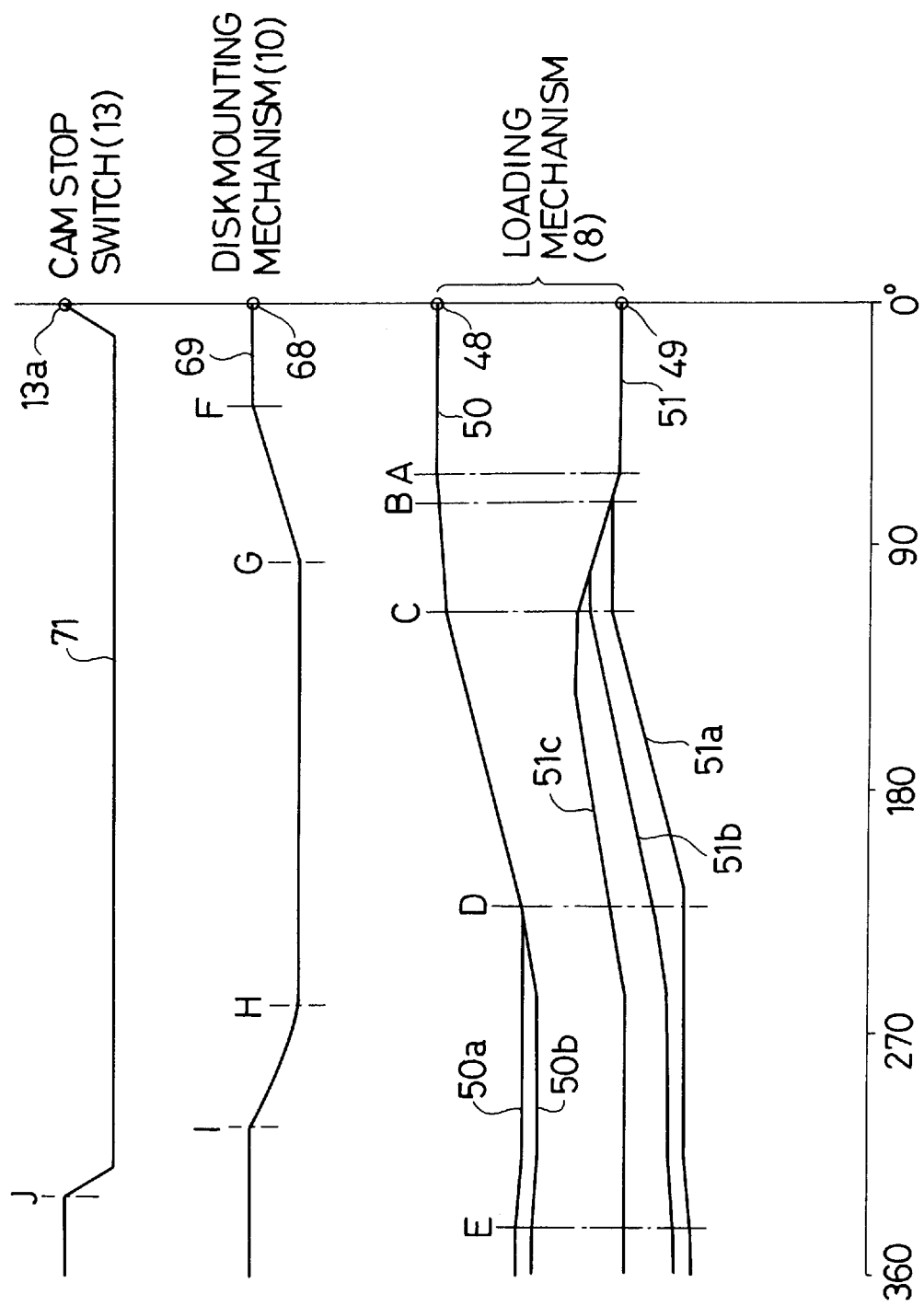

AUTOMATIC DISK CHANGER

BACKGROUND OF THE INVENTION

1. Field of the Invention

This invention relates to an automatic disk changer which picks up a desired one among a plurality of optical disks or magnet-optical disks such as compact disks (CDs) and mini-disks (MDs) which are arranged at predetermined intervals (hereinafter referred to merely as "disks", when applicable) so that data are recorded thereon or reproduced therefrom or erased therefrom.

2. Description of the Related Art

An example of an automatic disk changer of this type has been disclosed in Japanese Patent Unexamined Publication No. Sho. 61-156563. The automatic disk changer comprises a casing in which a disk arranging stand is provided on which a number of disks are arranged at predetermined intervals, and a carriage which is reciprocated along the disk arranging stand. The carriage has: a disk lifting mechanism which is adapted to slightly lift a specified disk among the disks arranged on the disk arranging stand; a loading mechanism which rolls the disk thus lifted to place it on the carriage; and a disk mounting mechanism which mounts the disk thus placed on a player body provided on the carriage.

The above-described automatic disk changer is disadvantageous in the following point: As was described above, the disk is delivered from the disk arranging stand to the disk mounting mechanism by means of the disk lifting mechanism and the loading mechanism; however, the disk delivering operation is carried out even if the specified disk is not present on the disk arranging stand, resulting in the occurrence of loss time.

SUMMARY OF THE INVENTION

In view of the foregoing, an object of the invention is to provide an automatic disk changer which is so designed that, in the disk loading operation, the disk delivering operation is stopped immediately when the specified disk is not present on the disk arranging stand.

In achieving the above object, a first aspect of the invention provides an automatic disk changer comprising: a loading mechanism which loads a specified one among a number of disks; and a disk mounting mechanism which receives a disk from the loading mechanism and mounts the disk on a player body, the loading mechanism comprising: a pair of disk clamping arms which clamp a specified disk; a pair of coupling bars coupled to base end portions of the disk clamping arms; a cam which swings the disk clamping arms with the aid of the coupling bars; and a disk presence/absence detector which is set confronted with one of the coupling bars, wherein the disk clamping arms are swung through the coupling bars by the cam, and when an angle formed by the disk clamping arms becomes smaller than in the case where the disk is clamped by the disk clamping arms, the disk presence/absence detector is activated by the one coupling bar.

A second aspect of the invention provides an automatic disk changer in which a disk arranging stand on which a number of disks are arranged at predetermined intervals, and a carriage which is allowed to reciprocate along the disk arranging stand are provided in a casing, and in which the carriage has a loading mechanism which clamps a specified disk on the disk arranging stand and delivers the specified disk onto the carriage, and a disk mounting mechanism which mounts the disk on a player body on the carriage, the loading mechanism comprising: a pair of disk clamping arms forming a predetermined angle which are swingably mounted through a supporting shaft on the carriage, a pair of coupling bars coupled to base end portions of the disk clamping arms, a cam which swings the disk clamping arms with the aid of the coupling bars, and a disk presence/absence detector which is-set confronted one of the coupling bars, wherein the disk clamping arms are swung through the coupling bars by the cam, and when an angle formed by the disk clamping arms becomes smaller than in the case where the disk is clamped by the disk clamping arm, the disk presence/absence detector is activated by the one coupling bar.

BRIEF DESCRIPTION OF THE DRAWINGS

FIG. 16 is a timing chart for a description of the operation of the automatic disk changer;

DETAILED DESCRIPTION OF THE PREFERRED EMBODIMENT

An automatic disk changer, which constitutes a preferred embodiment of the invention, will be described with reference to the accompanying drawings.

Figure 18:
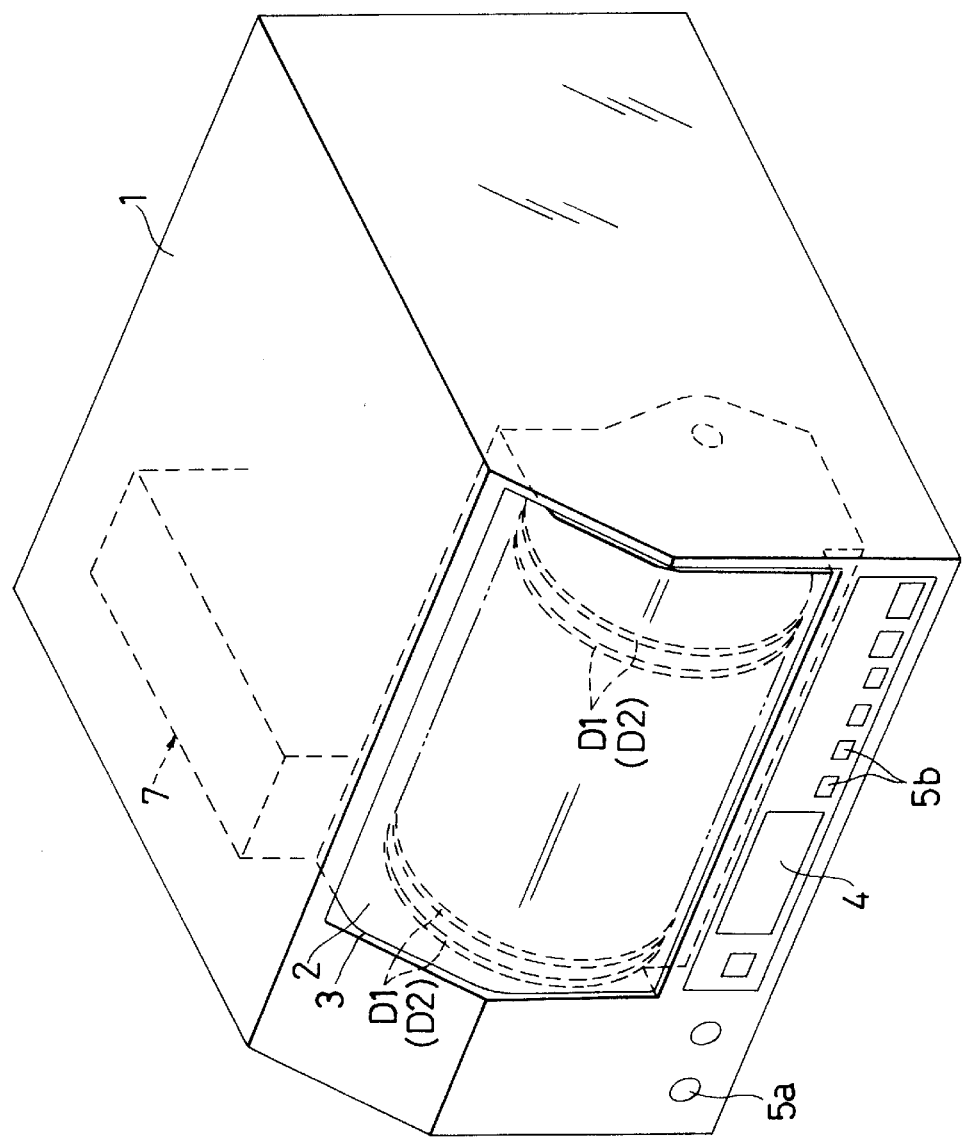
FIG. 18 is a perspective view of the automatic disk changer.

The disk changer of the embodiment, as shown in FIG. 18, comprises: a casing 1 which has an opening 3 with a lid 2 in the upper portion of the front wall thereof. Through the opening 3, large-diameter disks D1 (for instance 12 cm in diameter) and small-diameter disks D2 (for instance 8 cm in diameter) are put in the casing or taken out of the casing. Furthermore, a display section 4, and various operating switches such as a power switch 5a and disk specifying switches 5b are provided on the lower portion of the front wall of the casing 1.

Figure 1:
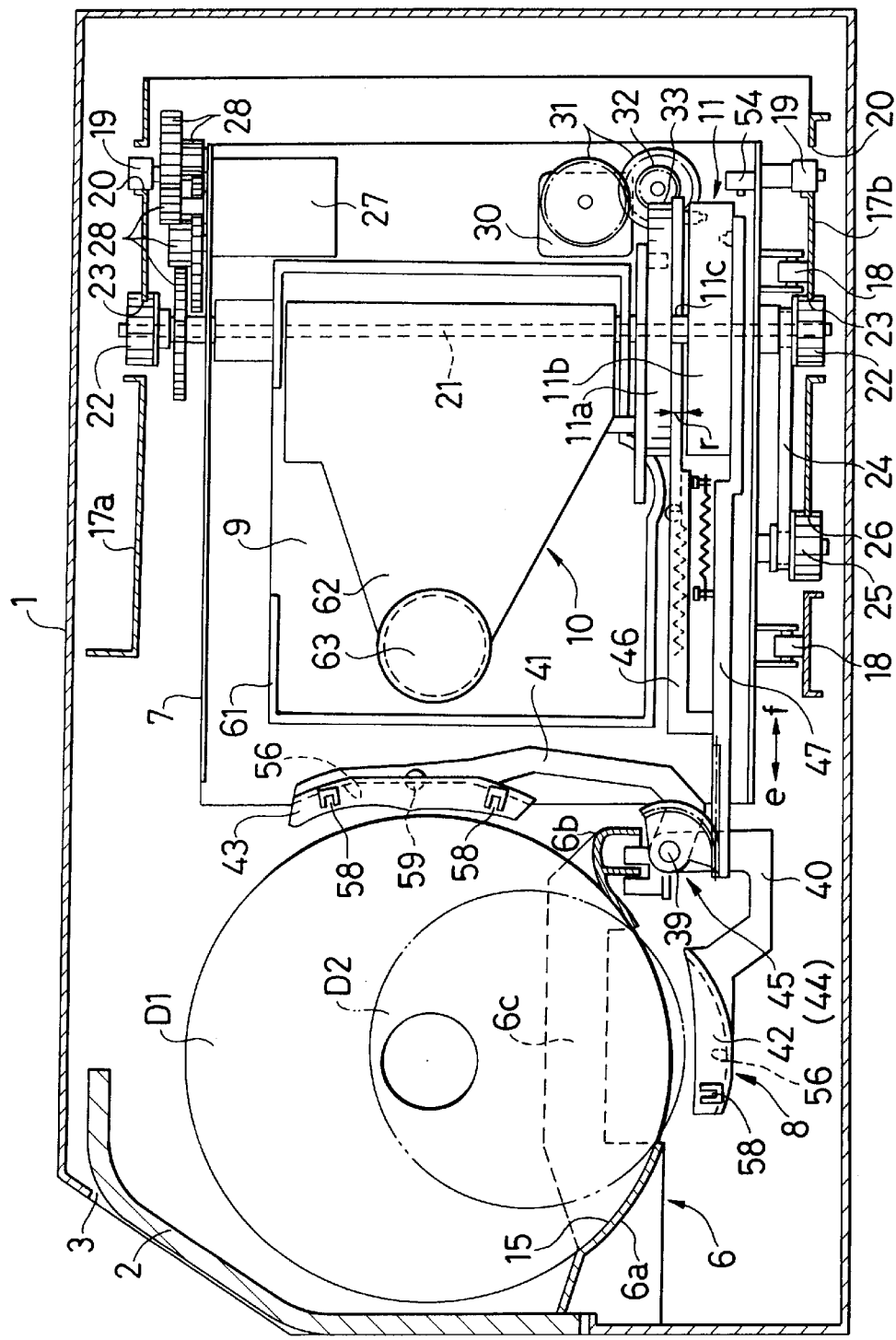
FIG. 1 is a vertical sectional view showing an automatic disk changer, which constitutes a preferred embodiment of the invention.
Figure 2:
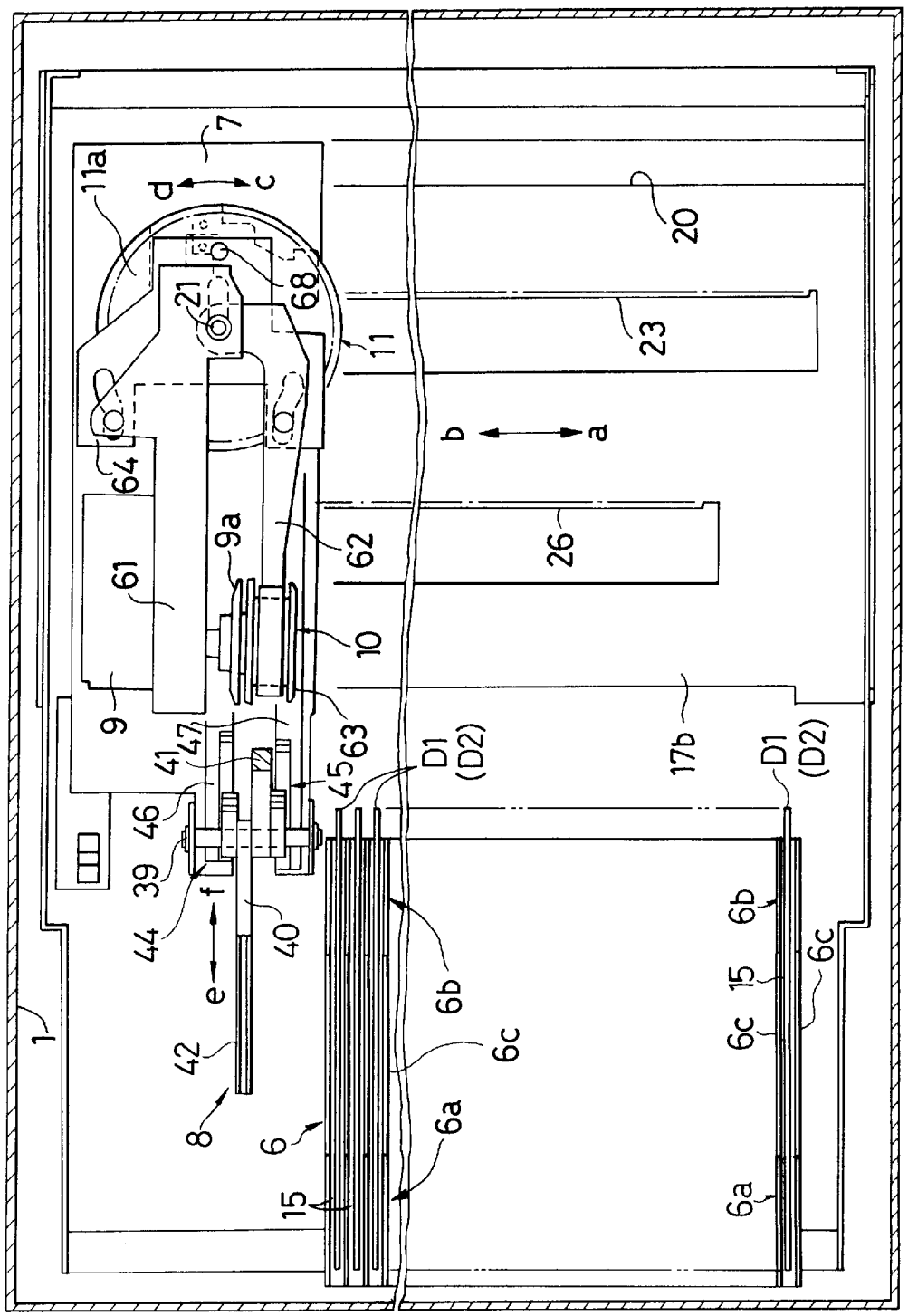
FIG. 2 is a horizontal sectional view of the automatic disk changer shown in FIG. 1.

As shown in FIGS. 1 and 2, a disk arranging stand 6, and a carriage 7 are provided inside the casing 1. A number of disks D1 and a number of disks D2 are arranged on the disk arranging stand 6 at predetermined intervals, and the carriage 7 is reciprocated horizontally (in the directions of the arrows a and b) along the disk arranging stand 6. The carriage 7 has a loading mechanism 8 which picks up a specified disk D1 or D2 from the disk arranging stand 6 and places it on the carriage 7, and a disk mounting mechanism 10 which mounts the disk D1 or D2 thus placed on a player body 9. On the carriage 7, a cam 11 for driving the two mechanisms 8 and 10 is rotatably provided. A cam stop switch 13 (cf. FIG. 15(b)) is provided between the carriage 7 and the cam 11 which detects when the cam 11 is turned through a predetermined angle in the forward or reverse direction to reach a stop position.

The disk arranging stand 6, as shown in FIGS. 1 and 2, comprises: a pair of a front line section 6a and a rear line section 6b which are arranged in parallel with each other with a predetermined space between them; and a number of guide plates 6c which are arranged parallel at intervals which are slightly larger than the thickness of the disks D1 or D2 longitudinally of the two sections 6a and 6b, thus forming disk inserting grooves 15 between the adjacent guide plates 6c.

In the disk changer thus designed, the disks D1 and D2 can be inserted into the predetermined disk inserting grooves 15 accurately.

The carriage 7, as shown in FIGS. 1 and 2, is arranged between the upper and lower base boards 17a and 17b. More specifically, the carriage 7 is mounted through wheels 18 on the lower base board 17b. Lateral vibration preventing rollers 19 and 19, which are protruded upwardly and downwardly from the carriage 7, are rollingly in abutment with the side edges of elongated holes 20 and 20 which are formed in the upper and lower base boards 17a and 17b, respectively. Pinions 22 and 22 fixedly mounted on both end portions of a supporting shaft 21 which penetrates the carriage 7 vertically, are engaged with racks 23 and 23 of the upper and lower base boards 17a and 17b, respectively. A transmission belt 24 is laid over the lower pinion 22 and another pinion 25 which is engaged with a rack 26 of the lower base board 17b. A carriage motor 27 is provided on the upper portion of the carriage 7. When the carriage motor 27 is driven, the pinions 22, 22 and 25 can be turned in the forward and reverse directions through a gear mechanism 28, so that the carriage 7 is moved in the directions of the arrows a and b.

The aforementioned cam 11, as shown in FIGS. 1 and 2, comprises upper and lower cam units 11a and 11b which are arranged parallel with a predetermined space r between them. The upper and lower cam units 11a and 11b are coupled to each other through a hollow shaft 11c, which is mounted on the supporting shaft 21 in such a manner that it is rotatable in the forward and reverse directions; i.e., in the directions of the arrows c and d. A cam motor 30 provided on the lower portion of the carriage 7 is driven to turn the cam 11 in the forward and reverse directions through a gear mechanism 31, a worm 32, and a gear 33 formed in the outer periphery of the upper cam unit 11a.

Figure 3:
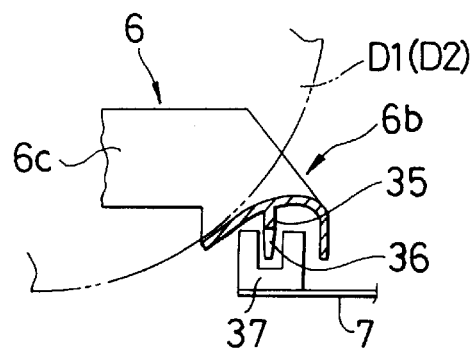
FIG. 3 is a cross sectional view showing a rear line section of a disk arranging stand in the automatic disk changer.
Figure 4:
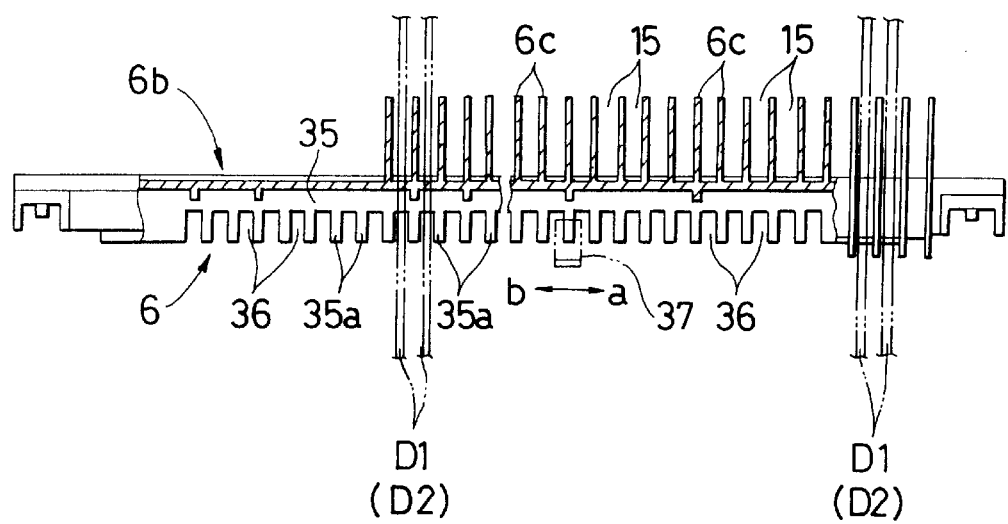
FIG. 4 is a longitudinal sectional view of the rear line section shown in FIG. 3.

As shown in FIGS. 3 and 4, an intermediate plate 35 is extended downwardly from the central portion of the lower surface of the rear line section 6b. The intermediate plate 35 has a number of slits 36 formed at predetermined intervals in such a manner that they are arranged horizontally (in the directions of the arrows a and b), thus forming teeth 35a. On the other hand, a photo-detector 37 comprising a light emitting unit and a light receiving unit arranged on both sides of the intermediate plate 35, is arranged on the carriage 7. When the carriage 7 is reciprocated horizontally (in the directions of the arrows a and b), the output light beam of the light emitting unit is intercepted by the teeth 35a, thus producing pulse signals. The pulse signals thus produced are counted, to detect the position of the carriage 7.

Figure 5:
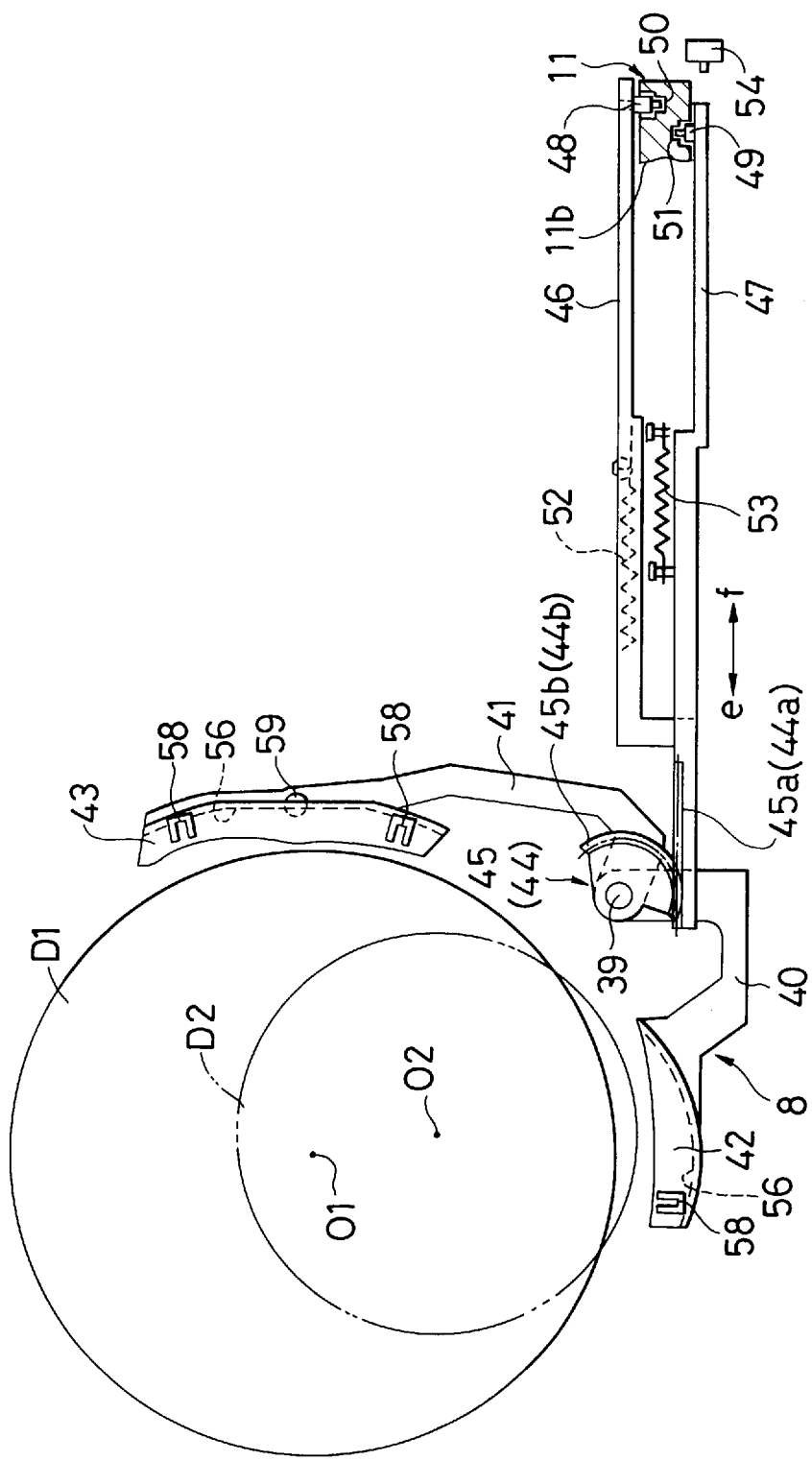
FIG. 5 is a side view showing a state of a loading mechanism in the automatic disk changer in which a disk is going to be loaded.
Figure 6:
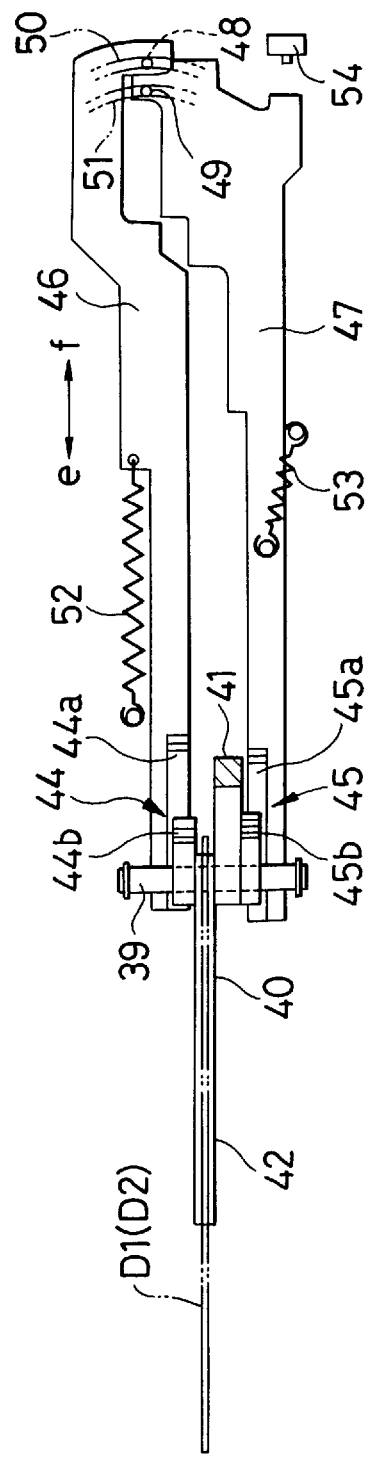
FIG. 6 is a plan view of the state of the loading mechanism shown in FIG. 5.

The aforementioned loading mechanism 8, as shown in FIGS. 5 and 6, comprises: disk clamping arms 40 and 41 whose base end portions are swingably coupled through a supporting shaft 39 to the carriage 7 so that the disk clamping arms 40 and 41 are swingably opened about 90°; disk locking frames 42 and 43 which are swingably coupled to the end portions of those arms 40 and 41, respectively; and a pair of coupling bars 46 and 47 which are supported in such a manner that they are movable horizontally (in the directions of the arrows e and f), and which are coupled through gear mechanisms 44 and 45 to the base end portions of the arms 40 and 41, respectively. The coupling bars 46 and 47 have cam pins 48 and 49 at the rear ends, respectively. The cam pins 48 and 49 are engaged with loading cam grooves 50 and 51 which are formed in the upper and lower surfaces of the lower cam unit 11b, respectively. An energizing spring 52 is coupled to the coupling bar 46 on the side of the front arm 40 to urge the coupling bar 46 forwardly, while an energizing spring 53 is coupled to the coupling bar 47 on the side of the rear arm 41 to urge the coupling bar 47 backwardly. Further, a disk presence/absence detector 54 made up of a limit switch or the like is provided confronted with the rear end of the coupling bard 47.

The above-described disk locking frames 42 and 43 are substantially U-shaped in cross section. In each of the frames 42 and 43, a disk inserting groove 56 is formed in the surface which is confronted with the disks. In both side walls of the front disk locking frame 42 and in both side walls of the rear disk locking frame 43, substantially U-shaped slits are cut to form pairs of tongue-shaped disk locking pieces 58. The end portions of the disk locking pieces 58 are inserted into the disk inserting groove 56, so that the end portions of the disk locking pieces 58 elastically clamp the peripheral portion of a disk D1 or D2 from both sides which has been-inserted into the grooves 56. The length of the front disk locking frame 42 is smaller than the distance between the front and rear line sections 6a and 6b of the disk arranging stand 6, and the width of the frame 42 is smaller than the distance between the guide plates 6c and 6c of the disk arranging stand 6, so that the front disk locking frame 42 is allowed to pass through a rectangular gap which is defined by the front and rear line sections 6a and 6b and by the guide plates 6c and 6c.

The disk changer is designed as described above. Hence, when a disk D1 or D2 is clamped with the pair of disk clamping arms 40 and 41 of the loading mechanism 8, the periphery of the disk D1 or D2 is inserted into the disk locking frames 42 and 43 of the arms 40 and 41, so that the periphery of the disk D1 or D2 is elastically locked by the pairs of disk locking pieces 58 of the disk locking frames 42 and 43. Hence, the disk D1 or D2 can be delivered to the disk mounting mechanism 10 while being held vertical. The disk locking frame 42 is integral with its own disk locking pieces 58, and the disk locking frame 43 is also integral with its own disk locking pieces 58, contributing to a reduction in the number of components, and accordingly to a decrease in manufacturing cost.

As shown in FIG. 5, a guide roller 59 is provided at the middle of the groove 56 of the rear disk locking frame 43.

Figure 10:
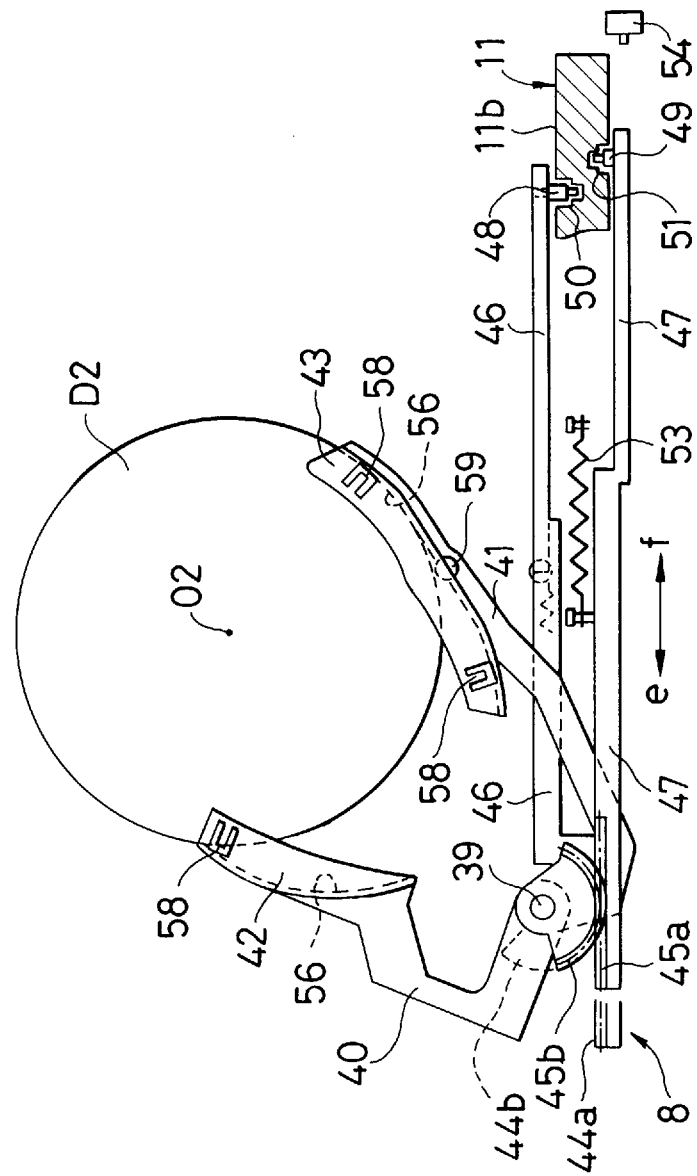
FIG. 10 is a side view for a description of the loading of a small-diameter disk.

Let us consider the case where, in the disk changer thus constructed, the large-diameter disk D1 and the small-diameter disk D2 are clamped with the disk locking frames 42 and 43 of the pair of disk clamping arms 40 and 41 one at a time. The two disks D1 and D2 are different in diameter from each other, as was described above. Hence, with the large-diameter disk D1 as a reference, the center O2 of the small-diameter disk D2 thus clamped is shifted from the center O1 of the large-diameter disk D1 thus clamped, and therefore it is impossible to mount the small-diameter disk D2 on the player body 9. However, it should be noted that the guide roller 59 is provided at the middle of the disk inserting groove 56 of the disk locking frame 43. Hence, when the small-diameter disk D2 is clamped with the disk locking frame 42 and 43 of the two arms 40 and 41, the small-diameter disk D2 is pushed upwardly by the guide roller 59, so that the center O2 of the small-diameter disk D2 is moved by the arms 40 and 41 to the center O1 of the large-diameter disk D1 held by the two locking frames 42 and 43. Therefore, similarly as in the case of the large-diameter disk D1, the small-diameter disk D2 can be delivered to the disk mounting mechanism 10; that is, it can be similarly mounted on the player body 9 (cf. FIG. 10).

The aforementioned gear mechanisms 44 and 45, as shown in FIGS. 5 and 6, comprise: racks 44a and 45a formed in the front end portions of the upper surfaces of the coupling bars 46 and 47; and sector-shaped pinions 44b and 45b which are engaged with the racks 44a and 45a, respectively. The pinions 44b and 45b are rotatably mounted on the aforementioned supporting shaft 39, and secured to the base end portions of the aforementioned arms 40 and 41, respectively.

With the disk changer thus constructed, in association with the push-pull operation of the pair of coupling bars 46 and 47, the pair of disk clamping arms 40 and 41 are positively swung until the angle between the two arms 40 and 41 is set to a predetermined value.

With the disk changer, the large-diameter disk D1 is loaded as follows: Before the large-diameter disk D1 is held with the loading mechanism 8, as shown in FIGS. 5 and 6, the disk locking frames 42 and 43 are held away from the large-diameter disk D1, and therefore the disk locking frames 42 and 43 will never collide with the large-diameter disk D1 when the carriage 7 is moved horizontally (in the direction of the arrow a or b).

Figure 15A:
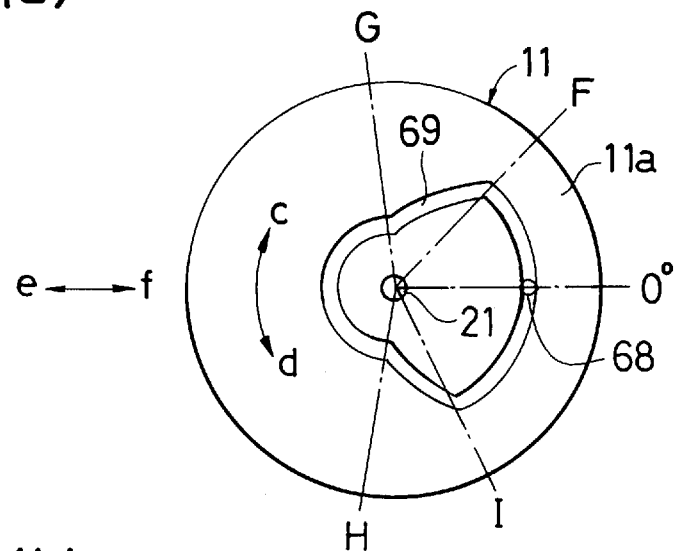
FIGS. 15(*a*) through 15(*c*) are plan views outlining a cam in the disk loading mechanism.
Figure 15B:
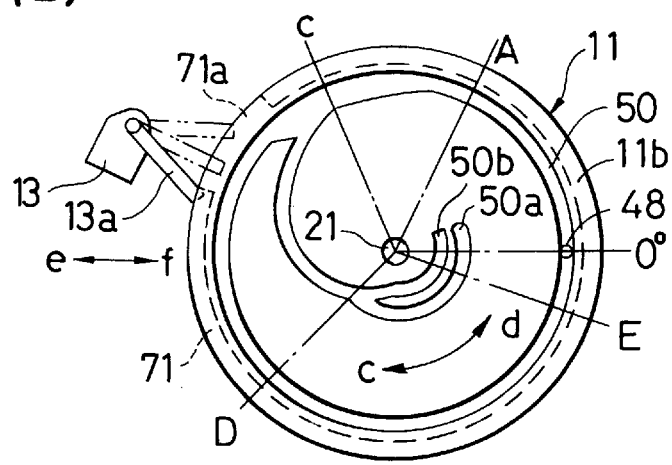
Figure 15C:
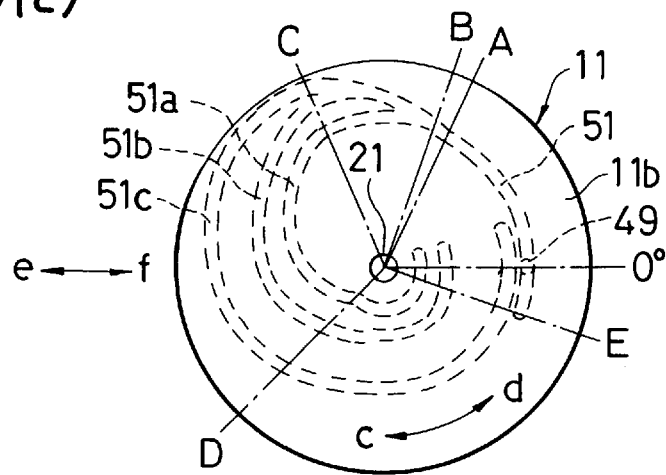

Next, the carriage 7 is stopped in front of the specified large-diameter disk D1, and the cam 11 is turned in the forward direction (in the direction of the arrow c). As a result, as shown in FIGS. 15(b), 15(c) and 16, until the cam 11 reaches the position A (65°) from 0°, the cam pins 48 and 49 are not moved in the cam grooves 50 and 51 in the directions of the arrows e and f; that is, the two arms 40 and 41 are held spaced from the large-diameter disk D1 (cf. FIGS. 5 and 6).

Figure 7:
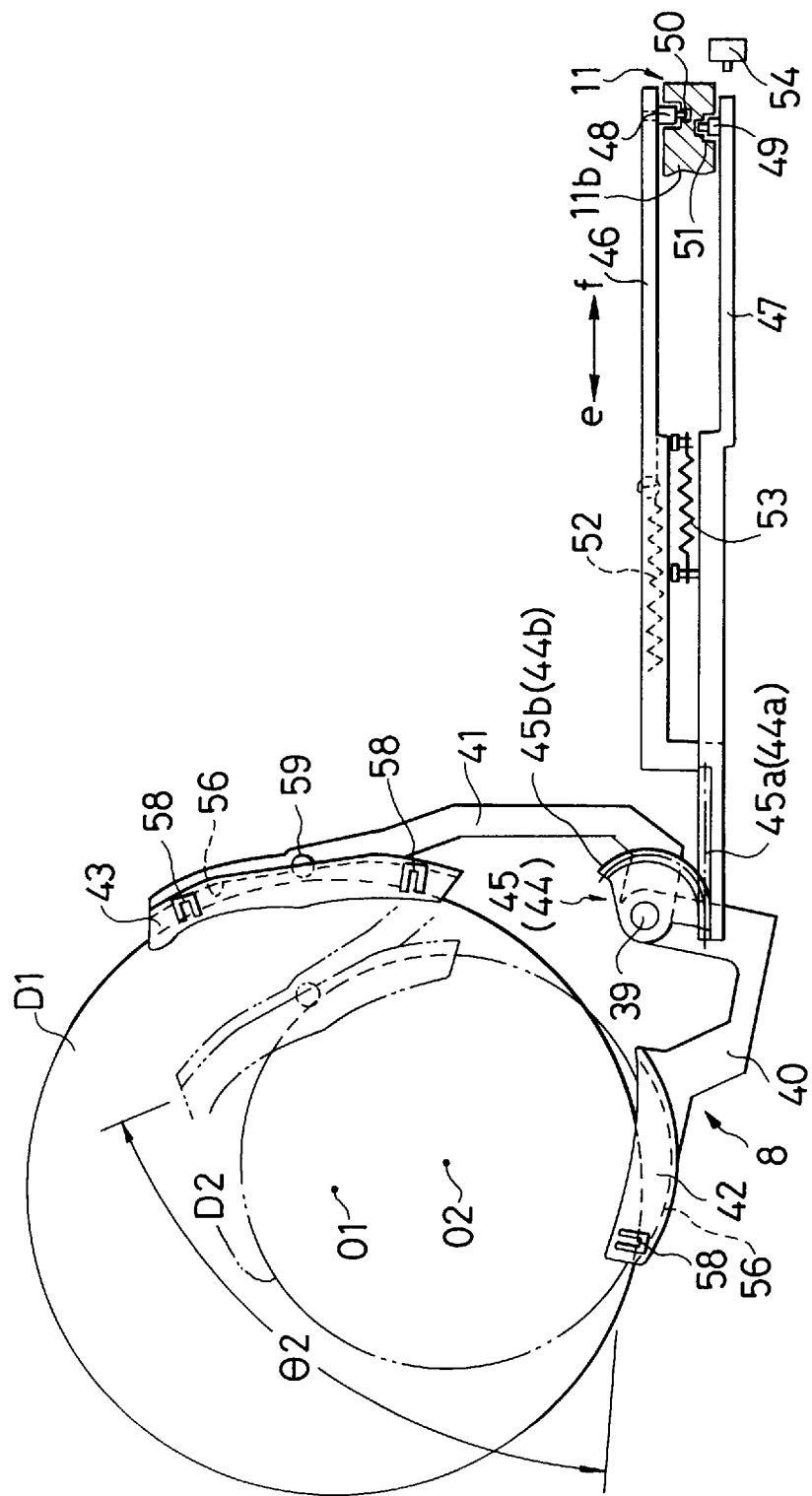
FIG. 7 is a side view showing another state of the loading mechanism in which a disk has been clamped.
Figure 8:
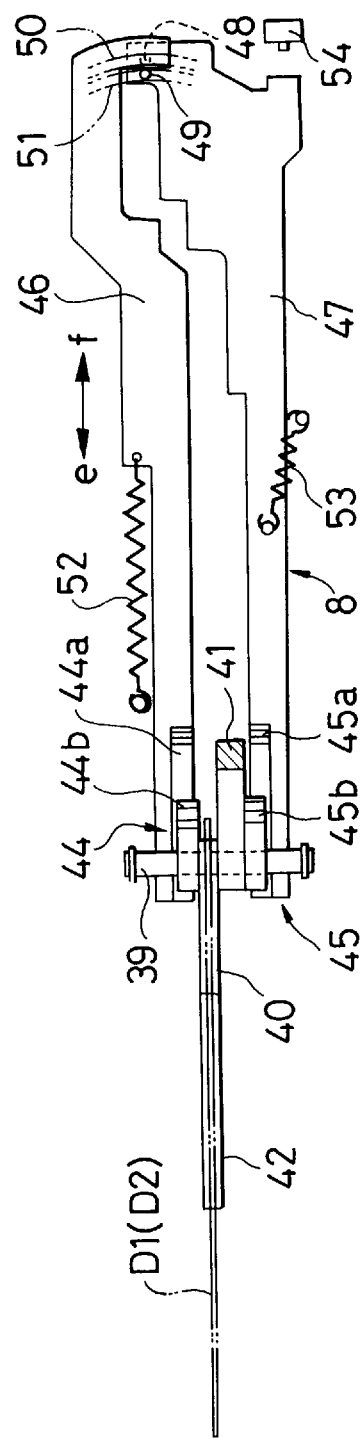
FIG. 8 is a plan view of the state of the loading mechanism shown in FIG. 7.

Until the cam 11 reaches the position B (72°) from the position A, the cam pin 49 is retracted in the direction of the arrow f, so that the rear arm 41 is swung forwardly to abut against the large-diameter disk D1; and until the cam 11 reaches the position C (115°) from the position B, the cam pin 49 goes in a large-diameter disk branch groove 51a of the cam groove 51, thus not being moved in the directions of the arrows e and f. That is, the rear arm 41 is held abutted against the large-diameter disk D1 (cf. the solid lines in FIG. 7, and FIG. 8).

Until the cam 11 reaches the position C (115°) from the position A, the cam pin 48 is moved forwardly in the direction of the arrow e, so that the front arm 40 is swung backwardly to abut against the large-diameter disk D1. Thus, the large-diameter disk D1 is clamped by the two arms 40 and 41 (cf. the solid lines in FIG. 7, and FIG. 8).

Figure 9:
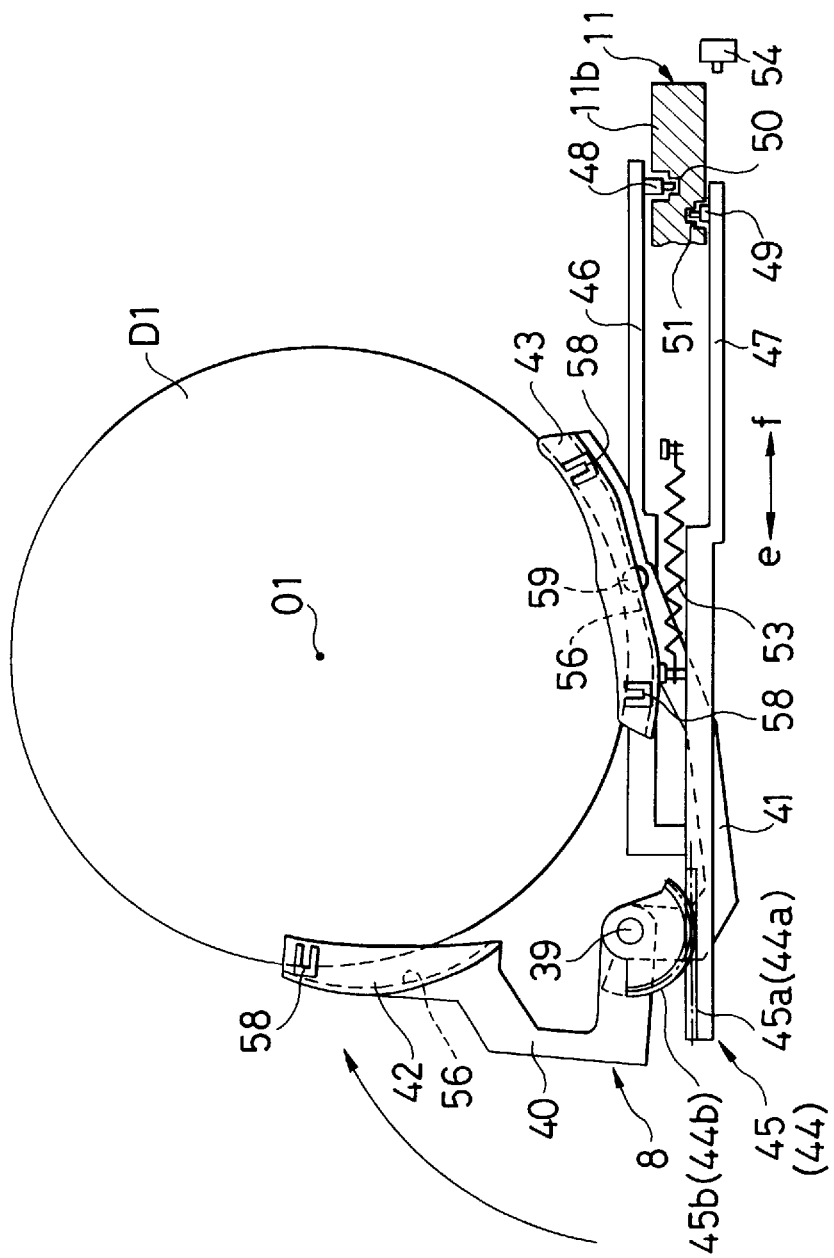
FIG. 9 is a side view for a description of the loading of a large-diameter disk.

Until the cam 11 reaches the position D (225°) from the position C, the cam pins 48 and 49 are moved forwardly in the direction of the arrow e, so that the two arms 40 and 41 clamping the large-diameter disk D1 are swung backwardly, thus inserting the large-diameter disk D1 into the disk mounting mechanism 10 (cf. FIG. 9).

Until the cam 11 reaches the position E (340°) from the position D, the cam pin 48 is moved into the large-diameter disk branch groove 50a, thus being moved backwardly in the direction of the arrow f. As a result, the cam pin 49 is moved forwardly in the direction of the arrow e. Hence, the two arms 40 and 41 are moved away from the large-diameter disk D1, so that the disk D1 is handed to the disk mounting mechanism 10.

The small-diameter disk loading procedure is substantially equal to the above-described large-diameter disk loading procedure; however, the former is different from the latter in the following points: That is, the cam pin 49 is moved in the small-diameter disk branch groove 51b of the cam groove 51, so that the rear arm 41 is more forwardly swung than in the case of the large-diameter disk D1, thus being abutted against the small-diameter disk D2. Thus, the small-diameter disk D2 is clamped by the two arms 40 and 41 (cf. the phantom lines in FIG. 7). As the cam pin 48 is moved in the small-diameter disk branch groove 50b of the cam groove 50, so that the front arm 40 is more backwardly swung than in the case of the large-diameter disk D1, and the small-diameter disk D2 is clamped by the two arms 40 and 41. In this case, the small-diameter disk D2 is pushed up by the guide roller 59, so that the center O2 of the small-diameter disk D2 is moved to the center O1 of the large-diameter disk D1 clamped by the arms 40 and 41 (the disks D1 and D2 becoming coaxial with each other). Hence, similarly as in the case of the large diameter disk D1, the small-diameter disk D2 is handed to the disk mounting mechanism 10, thus being mounted on the player body 9 (cf. FIG. 10).

In the case where the specified disk D1 or D2 is not present, and accordingly it is impossible for the arms 40 and 41 to clamp the specified disk, the cam pin 49 is moved in the outer branch groove 51c of the cam groove 51. As a result, the rear arm 41 is more forwardly swung than in the case of the small-diameter disk D2. As a result, the angle θ1 formed between the two arms 40 and 41 is smaller than that θ2 formed when the small-diameter disk D2 is clamped (cf. FIG. 11), and accordingly the coupling bar 47 is moved backwardly in the direction of the arrow f, thus striking against the disk presence/absence detector 54, to detect the fact that the disk D1 or D2 is not present. In response to the detection, the disk delivering operation can be stopped immediately; that is, loss time can be shortened as much.

Figure 12:
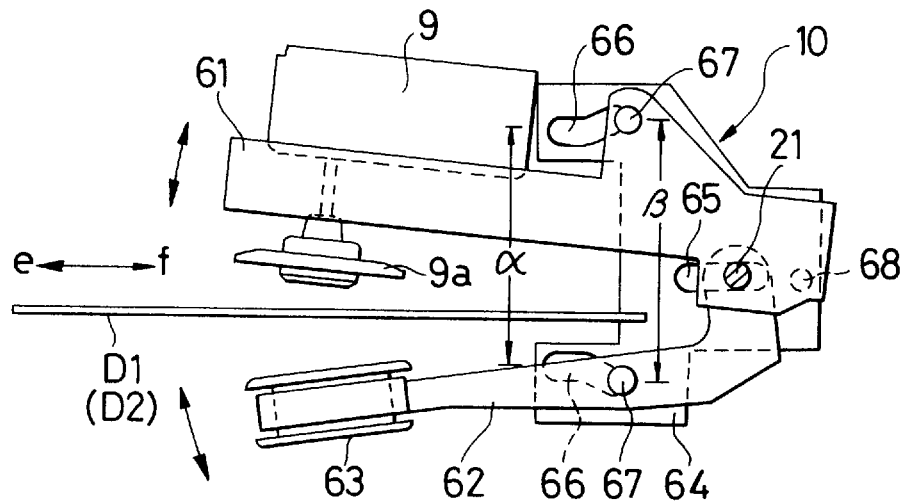
FIG. 12 is a plan view showing a state of a disk mounting mechanism in which a disk is going to be mounted on a player body.
Figure 13:
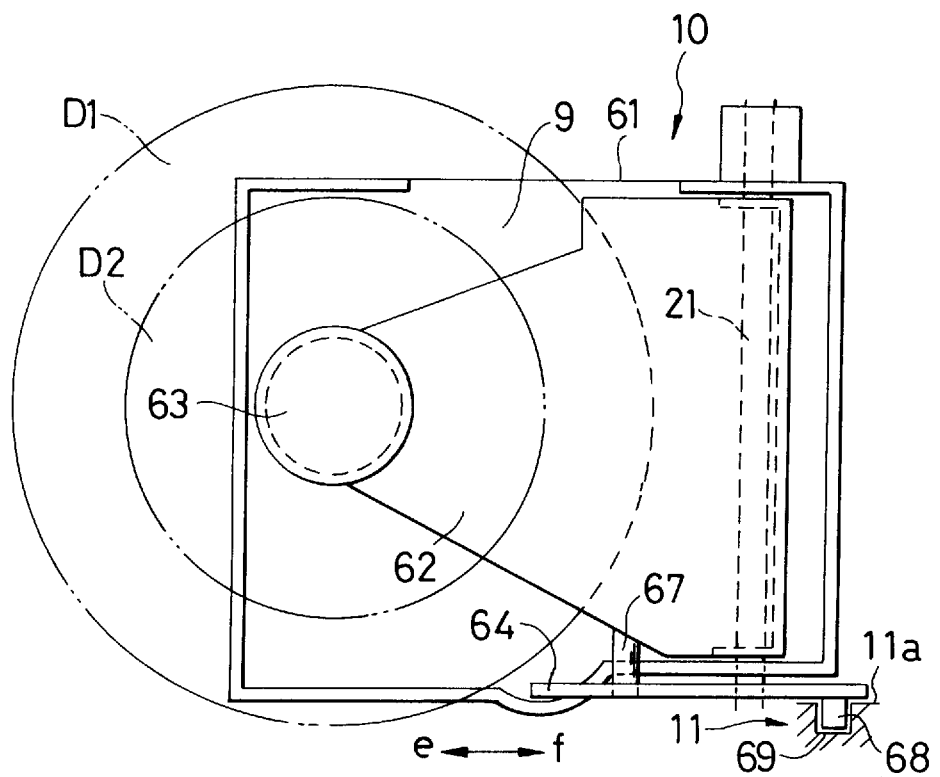
FIG. 13 is a side view of the state of the disk mounting mechanism shown in FIG. 12.

The aforementioned disk mounting mechanism 10, as shown in FIGS. 12 and 13, comprises a pair of swing frames 61 and 62 which are swingable about the supporting shaft 21. The player body 9 including a turn table 9a and an optical pickup is provided on one of the swing frames 61 and 62 (the swing frame 61 in the case of the embodiment), and a disk retaining member 63 is provided on the other swing frame 62 which is detachably engageable with the turn table 9a. An operating board 64 is provided below the swing frames 61 and 62 in such a manner that it is movable horizontally (in the directions of the arrows e or f), and an elongated hole 65 is formed in the middle of the operating board 64. The supporting shaft 21 is extended through the elongated hole 65 thus formed. The operating board 64 is fork-shaped, and has two-step bent holes 66 and 66 in its two prongs. Those bent holes 66 and 66 are engaged with engaging pins 67 and 67 protruded from the swing frames 61 and 62, respectively. A cam pin 68 is protruded from the base end portion of the fork-shaped operating board 64, and is fitted in a cam groove 69 formed in the upper surface of the upper cam unit 11a. The distance a between the front end portions of the bent holes 66 and 66 is smaller than the distance β between the rear end portions of the holes 66 and 66 (α<β).

Figure 14:
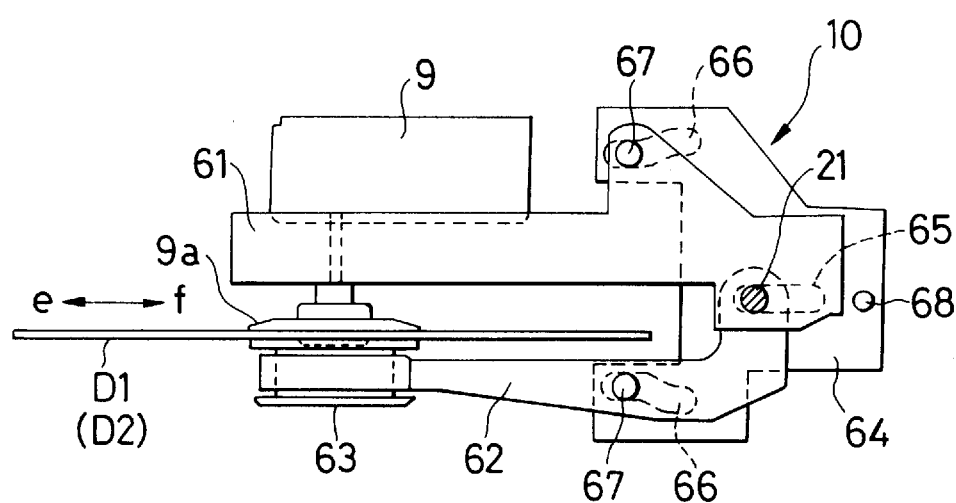
FIG. 14 is a plan view showing another state of the disk mounting mechanism in which the disk is being mounted on the player body.

Before the operation of the disk mounting mechanism 10, the swing frames 61 and 62 are held closed (cf. FIG. 2). Under this condition, the cam 11 is turned forwardly (in the direction of the arrow c). When, as shown in FIG. 15(a) and FIG. 16, the cam 11 reaches the position F (45°) from the position (0°), the cam pin 68 is moved forwardly, in the direction of the arrow e, with the aid of the cam groove 69, so that the rear end portions of the bent holes 66 and 66 are engaged with the engaging pins 67 and 67, and the swing frames 61 and 62 are opened swinging about the supporting shaft 21. This state is maintained until the cam 11 reaches the position H (260°) from the position G (95°). During this period, as shown in FIG. 12, the disk D1 or D2 is inserted between the swing frames 61 and 62 by means of the loading mechanism 8. Next, by the time instant that the cam 11 reaches the position I (295°), the cam pin 68 is moved backwardly, in the direction of the arrow f, with the aid of the cam groove 69, so that the front end portions of the bent holes 66 and 66 are engaged with the engaging pins 67 and 67, and the swing frames 61 and 62 are closed swinging about the supporting shaft 21. As a result, as shown in FIG. 14, the disk D1 or D2 is clamped by the turn table 9a and the disk retaining member 63, and mounted on the player body 9.

In the embodiment, the aforementioned cam stop switch 13 is a tumbler switch as shown in FIG. 15(b). The switch 13 has a detecting lever 13a which is engaged with a protrusion 71a left in a cam groove 71 which is formed in the side surface of the lower cam unit 11b in such a manner that it covers 340°.

Let us consider the case where the cam 11 is turned in the forward direction, in the direction of the arrow c. As shown in FIG. 15(b) and FIG. 16, immediately when the cam 11 leaves the position 0°, the detecting lever 13a is placed in a neutral state. When the cam 11 reaches the position J (340°), the detecting lever 13a strikes against the protrusion 71a, so that the cam stop switch 13 is activated to output a detection signal. In response to the detection signal, the rotation of the cam 11 is stopped. On the other hand, let us consider the case where the cam 11 is turned from the position J in the reverse direction (in the direction of the arrow d). When the cam reaches the zero position (0°), the detecting lever 13a strikes against the protrusion 71a, so that the cam stop switch 13 is activated to output a detection signal. In response to the detection signal, the rotation of the cam 11 is stopped.

As was described above, the loading mechanism 8, the disk mounting mechanism 10, and the cam stop switch 13 can be operated with only one cam 11. Hence, the resultant disk changer is simple in structure, and low in manufacturing cost.

Figure 17:
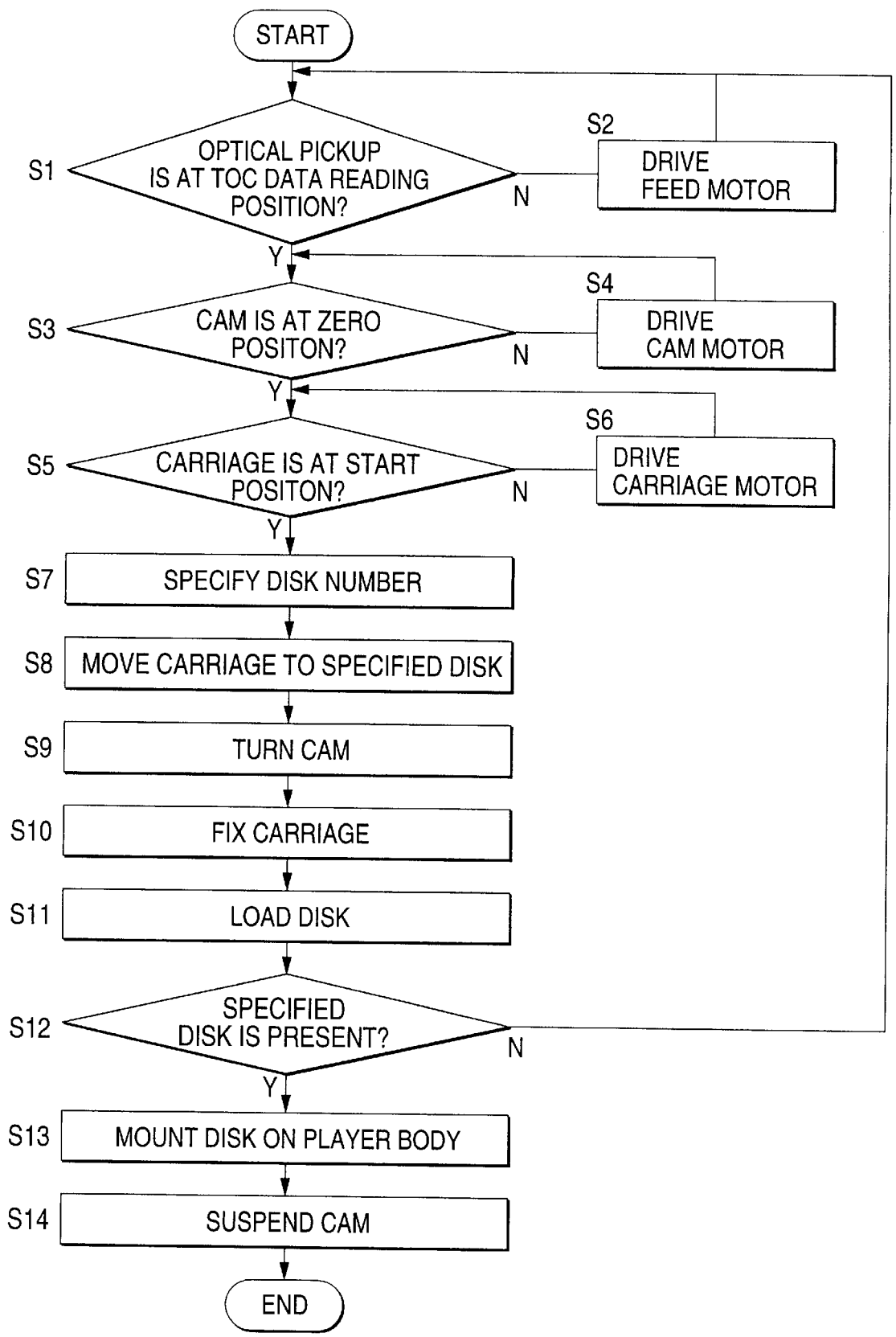
FIG. 17 is a flow chart for a description of the operation of the automatic disk changer.

The above-described loading mechanism 8 and disk mounting mechanism 10 are controlled by a control unit (not shown) comprising a microcomputer. The functions of the control unit will be described with reference to FIG. 17.

When a power switch 5a is depressed, the player body 9 is operated, and it is determined whether or not the optical pickup of the player body 9 is at a TOC data reading position for a disk D1 or D2 (Step S1). If the optical pickup is shifted from the TOC data reading position, a feed motor in the player body 9 is driven to move the optical pickup to the TOC data reading position (Step S2). Next, it is determined whether or not the cam 11 is at the zero position (0°) (Step S3). If the cam 11 is shifted therefrom, the cam motor 30 is driven so that the cam 11 is at the zero position (Step S4). Thereafter, it is determined whether or not the carriage 7 is at the start position (Step S5). If not, the carriage motor 27 is driven so that the carriage 7 is at the start position (Step S6). Next, a desired disk D1 or D2 is selected among a number of disks D1 and D2 on the disk arranging stand 6. In response to the selection of the disk, the disk specifying switch 5b is operated to specify the disk number (Step S7); that is, to output a specifying signal. In response to the specifying signal, the control unit drives the carriage motor 27 so that the carriage 7 is moved to the disk D1 or D2 thus specified (Step S8). As a result, as shown in FIGS. 5 and 6, the disk clamping arms 40 and 41 of the loading mechanism 8 are confronted through the specified disk D1 or D2 with each other.

Under this condition, the cam 11 is turned in the forward direction (in the direction of the arrow c) (Step S9), so that the disk mounting mechanism 10, the loading mechanism 8, and the cam stop switch 13 are operated one after another according to a timing chart shown in FIG. 16. This will be described in more detail. After the carriage 7 is fixed (Step S10), the disk D1 or D2 is loaded (Step S11). More specifically, the swing frames 61 and 62 are opened with the aid of the cam pin 68 and the cam groove 69 in the disk mounting mechanism 10, and the disk D1 or D2 clamped by the arms 40 and 41 is inserted between the swing arms 61 and 62 (cf. FIGS. 9, 10 and 12).

Figure 11:
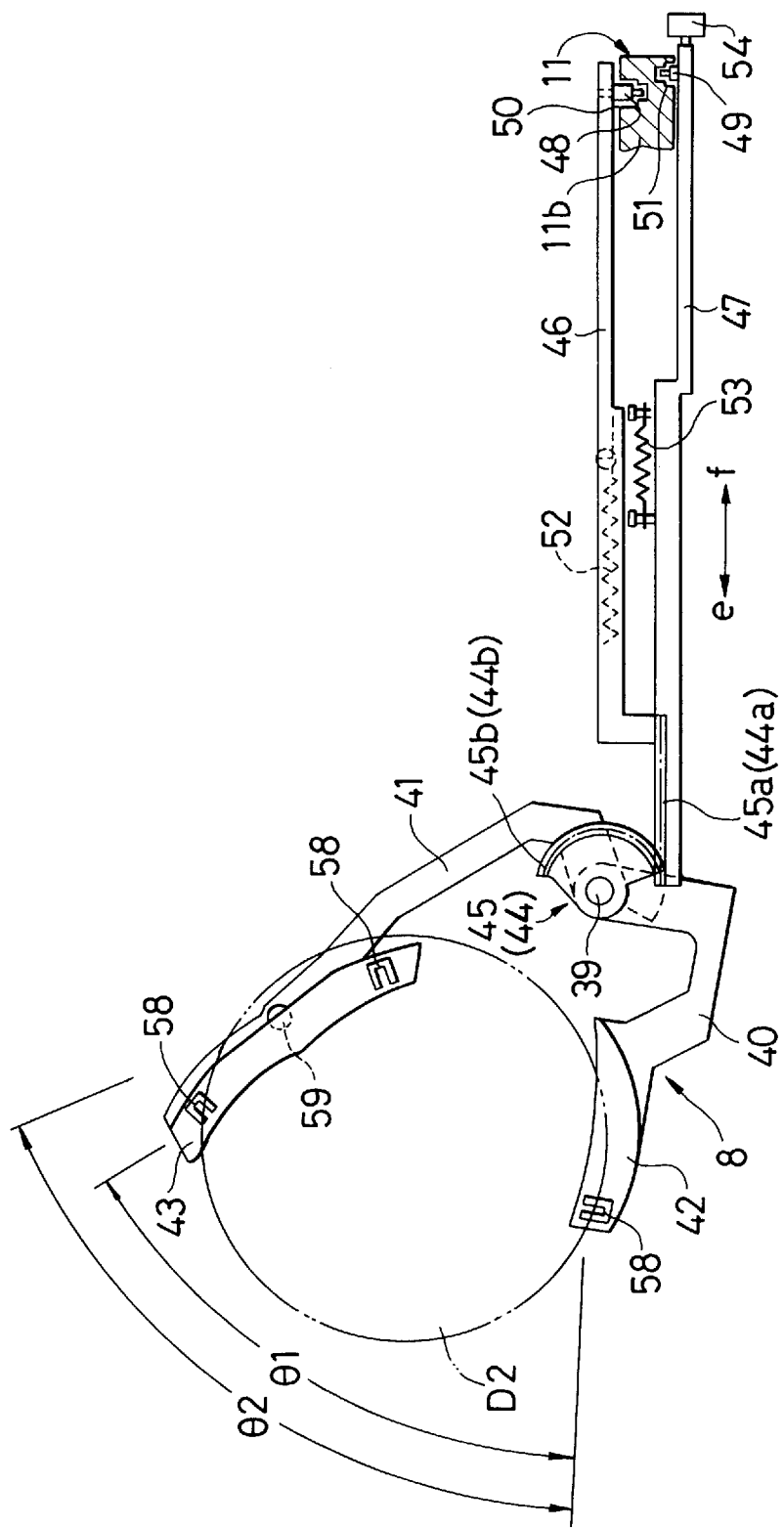
FIG. 11 is a side view showing another state of the loading mechanism in which a specified disk is not present on the disk arranging stand.

Next, during loading, it is determined whether or not the specified disk is present (Step S12). That is, in the case where the specified disk is not present, as shown in FIG. 11 the rear arm 41 is swung forwardly through a large angle. In response to this swing operation, the coupling bar 47 is moved backwardly in the direction of the arrow f to strike against the disk presence/absence detector 54 to activate the detector 54, so that the detector 54 outputs a detection signal. In response to the detection signal thus outputted, the above-described operations are canceled, so that the carriage 7 is returned to the original position.

When, as was described above, the disk D1 or D2 is set between the swing frames 61 and 62 of the disk mounting mechanism 10 (cf. FIG. 12), the swing frames 61 and 62 are closed, so that the disk D1 or D2 is clamped between the disk retaining member 63 and the turn table 9a, whereby the disk is mounted on the player body 9 (Step S13).

Next, the detecting lever 13a of the cam stop switch 13 is engaged with the protrusion 71a of the cam groove 71, to activate the cam stop switch 13. In response to the detection signal from the cam stop switch 13, the rotation of the cam 11 is stopped (Step S14).

Thereafter, the player body 9 is operated to reproduce data from the disk D1 or D2. After the reproduction, with the above-described operations performed in the reverse order, the disk D1 or D2 is returned to its original position on the disk arranging stand 6, and the carriage 7 is returned to the standby position.

According to the first aspect of the invention, if, when a disk is to be loaded, the disk is not present on the disk arranging stand, the angle formed between the disk clamping arms of the loading mechanism becomes smaller than in the case where the disk is clamped between them. This phenomenon is detected with the disk presence/absence detector, so that the disk delivering operation is stopped immediately, shortening the loss time as much.

According to the second aspect of the invention, among a number of disks arranged on the disk arranging stand, a desired one is specified, and the carriage is moved to the disk thus specified. Under this condition, the cam of the loading mechanism is turned to swing the pair of disk clamping arms with the aid of the coupling bars. Thus, the disk is clamped between the two arms, and delivered to the disk mounting mechanism. If, in this disk delivering operation, the disk is not present on the disk arranging stand, the angle formed between the disk clamping arms of the loading mechanism becomes smaller than in the case where the disk is clamped between them. This phenomenon is detected with the disk presence/absence detector, so that the disk delivering operation is stopped immediately, shortening the loss time as much.

What is claimed is:

1. An automatic disk changer comprising: a loading mechanism which loads a specified one among a number of disks; and a disk mounting mechanism which receives a disk from said loading mechanism and mounts the disk on a player body, said loading mechanism comprising:

a pair of disk clamping arms which clamp a specified disk, each disk clamping arm having an axis, said axes intersecting a common pivot axis to form an angle;

a cam;

a pair of coupling bars coupled to base end portions of said disk clamping arms and to said cam, movement of said cam causing said coupling bars to swing said disk clamping arms; and a disk presence/absence detector which confronts one of said coupling bars, wherein when said disk clamping arms are swung by said coupling bars in response to movement of said cam and said angle formed by said axes of said disk clamping arms becomes smaller than a reference angle which would be formed by said axes when said disk is clamped by said disk clamping arms, said disk presence/absence detector is activated by said one of said coupling bars.

2. The automatic disk changer as claimed in claim 1, wherein said pair of coupling bars are coupled through gear mechanisms to the base end portions of said pair of disk clamping arms, respectively.

3. The automatic disk changer as claimed in claim 1, wherein disk locking frames adapted to lock a small-diameter disk or a large-diameter disk which is larger in diameter than the small-diameter disk are coupled to front end portions of said pair of disk clamping arms respectively, said disk locking frames are each substantially U-shaped in section and have disk inserting grooves in surfaces thereof which confront a respective one of said small-diameter disk and said large-diameter disk, and a guide roller is provided in one of said grooves so that when the small-diameter disk is clamped through said disk locking frames between said disk clamping arms, the small-diameter disk is pushed up by said guide roller, whereby a center of the small-diameter disk is moved to a center of the large diameter disk which is clamped through said disk locking frame between said disk clamping arms.

4. The automatic disk changer as claimed in claim 1, wherein said coupling bars have cam pins, which are engaged with loading cam grooves formed in upper and lower surfaces of said cam respectively.

5. An automatic disk changer in which a disk arranging stand on which a number of disks are arranged at predetermined intervals, and a carriage which is allowed to reciprocate along said disk arranging stand are provided in a casing, and in which said carriage has a loading mechanism which clamps a specific disk on said disk arranging stand and delivers the specified disk onto said carriage, and a disk mounting mechanism which mounts the disk on a player body on said carriage, said loading mechanism comprising:

a pair of disk clamping arms having axes which form an angle, said disk clamping arms being swingably mounted to a common supporting shaft on said carriage;

a cam;

a pair of coupling bars coupled to base end portions of said disk clamping arms and to said cam, movement of said cam causing said coupling bars to swing said disk clamping arms; and a disk presence/absence detector which confronts one of said coupling bars, wherein when said disk clamping arms are swung by said coupling bars in response to movement of said cam and said angle formed by said axes of said disk clamping arms becomes smaller than a reference angle which would be formed by said axes when said disk is clamped by said disk clamping arms, said disk presence/absence detector is activated by said one of said coupling bars.

6. The automatic disk changer as claimed in claim 5, wherein said pair of coupling bars are coupled through gear mechanisms to the base end portions of said pair of disk clamping arms, respectively.

7. The automatic disk changer as claimed in claim 5, wherein disk locking frames adapted to lock a small-diameter disk or a large-diameter disk which is larger in diameter than the small-diameter disk are coupled to front end portions of said pair of disk clamping arms respectively, said disk locking frames are each substantially U-shaped in section and have disk inserting grooves in surfaces thereof which confront a respective one of said small-diameter disk and said large-diameter disk, and a guide roller is provided in one of said grooves so that when the small-diameter disk is clamped through said disk locking frames between said disk clamping arms, the small-diameter disk is pushed up by said guide roller, whereby a center of the small-diameter disk is moved to a center of the large diameter disk which is clamped through said disk locking frame between said disk clamping arms.

8. The automatic disk changer as claimed in claim 5, wherein said coupling bars have cam pins, which are engaged with loading cam grooves formed in upper and lower surfaces of said cam respectively.

* * * * *